United States Patent [19]

Brooks et al.

[11] 4,235,652
[45] Nov. 25, 1980

[54] METHOD OF USING A LOW PROFILE HEAT SEALING IRON

[75] Inventors: Ray G. Brooks, Irving, Tex.; Harvell M. Smith, Conifer, Colo.

[73] Assignee: Johns-Manville Corporation, Denver, Colo.

[21] Appl. No.: 19,969

[22] Filed: Mar. 12, 1979

Related U.S. Application Data

[62] Division of Ser. No. 765,140, Feb. 3, 1977, Pat. No. 4,160,688.

[51] Int. Cl.² .............................. C09J 5/10; C09J 7/00
[52] U.S. Cl. ........................................ 156/71; 138/155; 138/DIG. 1; 156/320; 156/574; 156/579; 219/245; 156/309.9; 156/324.4
[58] Field of Search ................. 156/71, 306, 320, 543, 156/538, 505, 523, 527, 574, 579, 583, 304, 158, 293, 294, 309; 219/227, 228, 245, 254; 138/155, DIG. 1; 126/119

[56] References Cited

U.S. PATENT DOCUMENTS

| 2,609,316 | 9/1952 | Fichtner | 156/583.5 |
|---|---|---|---|
| 2,703,133 | 3/1955 | Payton | 156/583.1 |
| 2,709,742 | 5/1955 | Perry | 156/574 |
| 2,759,618 | 8/1956 | Vogt | 156/359 |
| 2,814,710 | 11/1957 | Schuetze | 156/579 |
| 3,390,673 | 7/1968 | Ernst | 126/410 |
| 3,619,333 | 11/1971 | Mender | 156/583.1 X |
| 3,972,768 | 8/1976 | Hill | 156/579 X |

Primary Examiner—Michael G. Wityshyn
Attorney, Agent, or Firm—Robert M. Krone; Joseph J. Kelly; William C. Anderson

[57] ABSTRACT

A low profile heat sealing iron for use in applying heat activatable tape in areas of very limited access, such as the sealing of periodic joints in air duct is disclosed. The low profile sealing iron requires only a few inches or less of clearance and has a tape guiding means that feeds the tape to the proper location for heat sealing as the iron is slid along the surface of the member on which the tape is being applied. Preferably, the iron has a handle of adjustable length which permits the sealing iron to be used on ducts measuring six to eight feet or more when the handle is extended, but having a handle only about three feet long or less for easy carrying and handling at other times. A method of using the low profile sealing iron to seal joints in air ducts is also disclosed.

2 Claims, 4 Drawing Figures

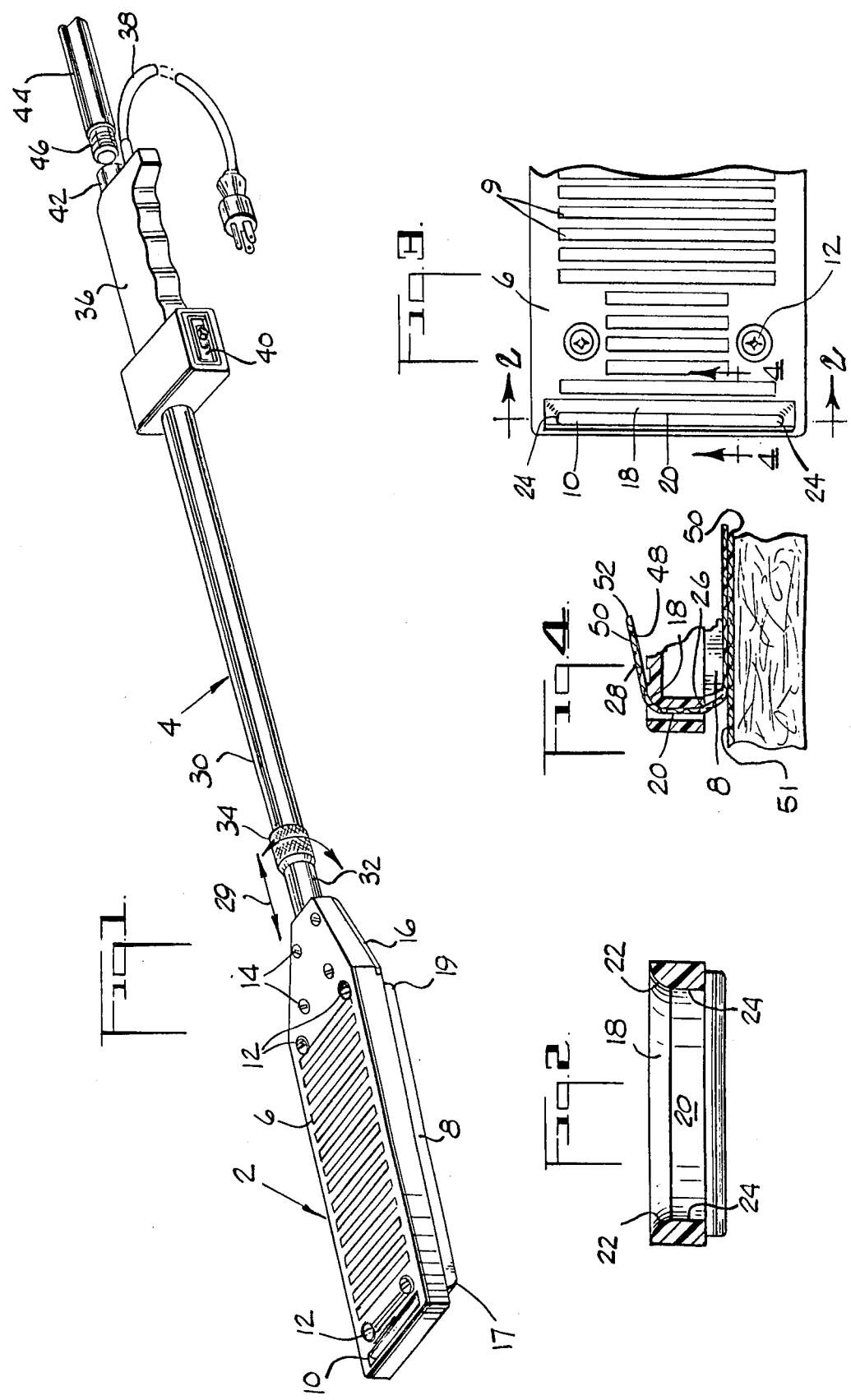

METHOD OF USING A LOW PROFILE HEAT SEALING IRON

This is a division of application Ser. No. 765,140, filed Feb. 3, 1977, now U.S. Pat. No. 4,160,688.

It is common practice to use thermally sensitive or heat activated securing and sealing tapes or laminated tapes having such a heat activatable or thermoplastic sealing surface by either heating the tape just prior to application, as disclosed in U.S. Pat. No. 2,759,618, or by heating the tape with a heating device after the tape has been applied to the desired area, as disclosed in U.S. Pat. No. 3,390,673.

There are many applications for such heat activatable tape. One common application is in the sealing of joints in air duct. In one well known type of air duct system in which this tape is used, fibrous thermal isulating material such as fiber glass duct board is covered on one face with a fluid impervious material such as a laminate of a kraft paper, an outer layer of aluminum foil, with a reinforcing scrim laminated therebetween. The duct boards are then grooved which allows the board to be folded into a duct having a polygonal cross-section, e.g. square or rectangular. Various lengths of such ducts are then connected end-to-end to form a duct system. The joints formed by putting together two lengths of duct must be sealed to prevent air leakage and this can be accomplished by a heat activatable tape applied to the outer surface of the duct itself.

Frequently the ducts are installed in such a manner that the joints must be sealed by the heat sealing tape after the duct is placed in its working position. Often there is very little clearance between the duct and some part of the building structure or roof; too little clearance to permit the use of devices such as disclosed in the above cited patents or other conventional heat sealing irons. The use of pressure sensitive tape is also made difficult by the low clearance, particularly when the span is as much as 4–8 feet or more.

The object of the present invention is to provide a low profile sealing iron that can be used in areas having very little clearance and which has tape guiding means located in a front portion of the tool such that the tape is fed to the proper location as the iron is slid along the surface to be sealed. Thus the operator has only to guide the iron in the proper direction to properly apply the sealing tape.

BRIEF SUMMARY OF THE INVENTION

The present invention provides a low profile sealing iron adapted to be moved along a generally planar surface comprising a low profile head comprising a heating plate means having a head end and a foot end for heating a heat activatable tape or strip fed first to the head end and later towards the foot end of said plate means and for pressing the tape against the generally planar surface as the head is slid along to move linear increments of the tape from the head end to the foot end, and guide means for guiding the tape to the head end of the heating plate means, and handle means connected to the low profile head for moving the head along the generally planar surface, the handle also being of low profile. The guide means for directing the tape to the heating plate means is a slot located in the low profile head above and adjacent to the head end of the heating plate means and preferably has beveled surfaces exposed to the surface of the tape and to the edges of the tape, the latter to prevent the tape from hanging up in the slot when the tape enters the slot from an angle. Preferably the guiding slot is contained completely within the low profile head. Also, preferably the handle is adjustable in length, e.g. from about 1.5 feet to 8 feet or more, and does not extend significantly above the top surface of the low profile head.

The present invention also provides a method of using the low profile sealing iron wherein a leading edge of tape having a heat activatable surface is inserted into the guiding slot with the heat activatable surface facing away from the heating plate, the leading end of the tape is moved down through the slot and bent back under the head to contact the head end of the heating plate, the heat activatable surface of the leading end of the tape is then applied to the starting point of a generally planar surface to be sealed and the iron is slid along the generally planar surface over the area to be sealed for a desired distance.

BRIEF DESCRIPTION OF THE DRAWINGS

FIG. 1 is a perspective view of a preferred embodiment of the low profile sealing iron of the present invention.

FIG. 2 is a cross section taken lines 2—2 in FIG. 3 and shows the beveled surfaces of the preferred tape guiding slot.

FIG. 3 is a partial plan view of the low profile head of the low profile sealing iron shown in FIG. 1.

FIG. 4 is a partial cross sectional view taken along lines 4—4 in FIG. 3 of the tape guiding slot in the low profile head and additionally shows the tape being guided to the heating plate by the guide slot and being applied by the heating plate.

DETAILED DESCRIPTION AND PREFERRED EMBODIMENTS

Referring to FIG. 1, the low profile heat sealing iron of the present invention comprises a low profile head 2 and a handle 4. The low profile head 2 comprises a cap member 6, a heat sealing plate 8 containing a conventional heating element (not shown), and a tape or strip guiding slot 10. The cap 6 can be made from any heat resistant material, but preferably is made using a conventional fiber glass filled nylon molding composition. The cap 6 has holes at appropriate locations for screws 12 which hold the heating plate 8 to the cap 6. The cap 6 also has holes for screws 14 which attach to a lower plate 16 and which cooperate in a conventional manner to secure the handle 4 to the head 2. The rectangular slight depressions 9 in the cap 6 are an uncritical feature that permit a reduction in the weight of cap 6.

The heating plate 8 can be made from any heat resistant and heat conductive material commonly used to make heating plates, but preferably is made from aluminum or an aluminum containing alloy. The heating plate 8 has a head end 17 and a foot end 19 and contains a conventional electric resistant heating element (not shown) attached to the plate 8 in a known manner. Preferably the width of the heating plate 8 is a little greater than the width of the sealing tape or strip to be applied. The length of the heating plate 8 is a matter of choice but should be sufficiently long to provide sufficient heat to permit the head to be moved at a reasonably rate for efficient operator productivity.

The guide slot 10, in the preferred embodiment, is contained within and is a portion of the cap 6. Slot 10 is a rectangular slot having a width slightly greater than the tape or strip to be applied and preferably having certain surfaces beveled to permit easier tape movement through the slot, as shown in FIGS. 2-4. As shown in FIGS. 1, 3, and 4, the slot 10 is located in the front portion of the cap 6 above and adjacent to a head end of the heating plate 8.

Preferably an upper portion 18 of a long dimensional back surface 20 of the slot 10 is beveled, as best shown in FIG. 4, to facilitate movement of the tape through the slot 10. Most preferably, the upper portions 22 of the short dimensional surfaces 24 of the slot 10 are also beveled to avoid any hangup of a tape entering the guide slot 10 from an angle with respect to the center line of the low profile sealing iron and guide slot 10. Also preferably, a bottom portion 26 (FIG. 4) of the back surface 20 is slightly beveled to facilitate easy movement of a tape 28 from the slot 10 to the head end 17 of the heating plate 8. Although the guide means or slot 10 could extend above the top surface of the cap 6, there is no need for it doing so and such a construction would merely increase the clearance requirements of the low profile head 2.

The handle 4 can be of any conventional shape, but preferably is made of a tubular material such as a lightweight aluminum or aluminum alloy. Preferably, the handle telescopes as indicated by the arrows 29 by comprising a larger diameter hollow tubular member 30 and a smaller diameter tubular member 32 having an OD sufficiently small to fit inside the ID of the member 30. A knurled tightening member 34 is threaded onto the end of the member 30 in a conventional way so that when loosened the member 32 can be slid with respect to the member 30 to lengthen or shorten the handle 4. When adjusted to the proper length, the knurled member 34 is tightened onto the member 30 to lock the member 32 with respect to the member 30. The members 32 and 30 can be of variable lengths, but preferably are of sufficient lengths to provide a length for handle 4 varying between about 18 inches to about 36 inches or more. Preferably, the handle straddles the center line of the cap 6 and does not extend above the top of the cap, but this is not essential.

On the end portion of the member 30, opposite the threaded portion cooperating with the tightening member 34, a grip 36 is preferably located. This grip can be of any suitable design such as the one shown, or can be a pistol grip, etc. The grip 36 can be made of any conventional material and attached in any conventional way to the member 30. Preferably, the grip 36 accommodates an electrical wire 38 which runs through the grip 36 to an optional conventional on-off switch 40, also located in the grip 36, and on down through the center of the members 30 and 32 to connect with the conventional heating element in the heating plate 8.

Located in the grip end of the member 30 in the preferred embodiment is an insert 42, preferably containing female threads. The insert 42 permits extension handle members 44 of various lengths to be attached, e.g. by way of a male threaded end portion 46, to the handle member 30 to effectively extend the length of the handle 4 when necessary without decreasing the compactness of the low profile sealing iron when used in normal situations.

In the operation of the preferred embodiment shown in FIGS. 1-3, a conventional heat sealing tape 28 having an aluminum foil outer layer 48, a thermoplastic inner layer 50, and a reinforcing scrim 52 located therebetween, is fed down through the slot 10, see FIG. 4, in such a manner that the aluminum foil layer 48 is adjacent to the surface 20 and the heating plate 8. The leading end of the tape 28 is bent under the device to contact the head end 17 of the heating plate 8. The heating plate 8 is then placed on the planar surface to be sealed 51 and moved along the area to be sealed. This movement causes the tape to feed through the slot 10 and onto the plate 8 and along the length of the plate 8 where it is sealed to the generally planar surface. The operator need only guide the sealing head 2 over the area to be sealed.

After reaching the end of the area to be sealed, the tape can be cut above the slot 10 or in the area between the slot 10 and the heating plate 8 by any manner, and the low profile iron can be removed from the area above the duct. Also, a proper length of sealing tape 28 can be cut before the sealing job is started such that when the end of the area to be sealed has been reached the length of the tape will have been almost more completely exhausted.

When the term "low profile" is used herein what is meant is something requiring less than about 2.5 inches of clearance, and preferably less than 2 inches of clearance and most preferably less than 1.5 or even about 1.13 inches clearance. The unique features of the present invention permit the application of a heat activatable tape to be accomplished in areas heretofore unaccessable by conventional heat sealing apparatus and techniques.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims appended hereto.

What we claim is:

1. A method of applying a heat activatable sealing strip to a generally planar surface in an area having a clearance of no more than a few inches comprising inserting a strip of heat activatable material into the guide means of a low profile sealing iron having a longitudinal axis comprising a cap member having generally planar first and second faces, heating plate means attached to said second face and having a head end and a foot end, guide means comprising a rectangular slot passing through said cap member from said first face to said second face adjacent the head end of said heating plate means, and handle means connected to said low profile head, moving the leading end of said strip through said guide means and beneath the head end of said heating plate, placing said heating plate onto said generally planar surface at a first terminal end of an area to be sealed and sliding said iron over the generally planar surface of the area to be sealed to an opposite terminal end of said area.

2. A method as defined in claim 1 wherein said surface is a surface of an air duct.

* * * * *